Jan. 12, 1937.  W. L. BENNINGHOFF  2,067,626
PIPE THREADING MACHINE
Filed Jan. 28, 1935  3 Sheets-Sheet 1
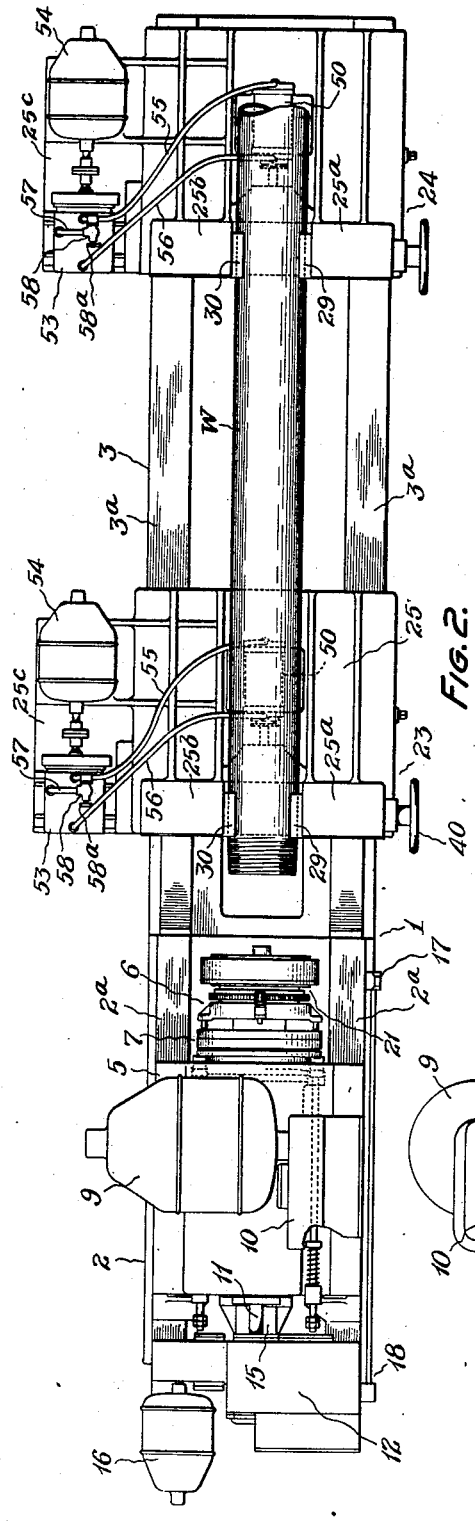
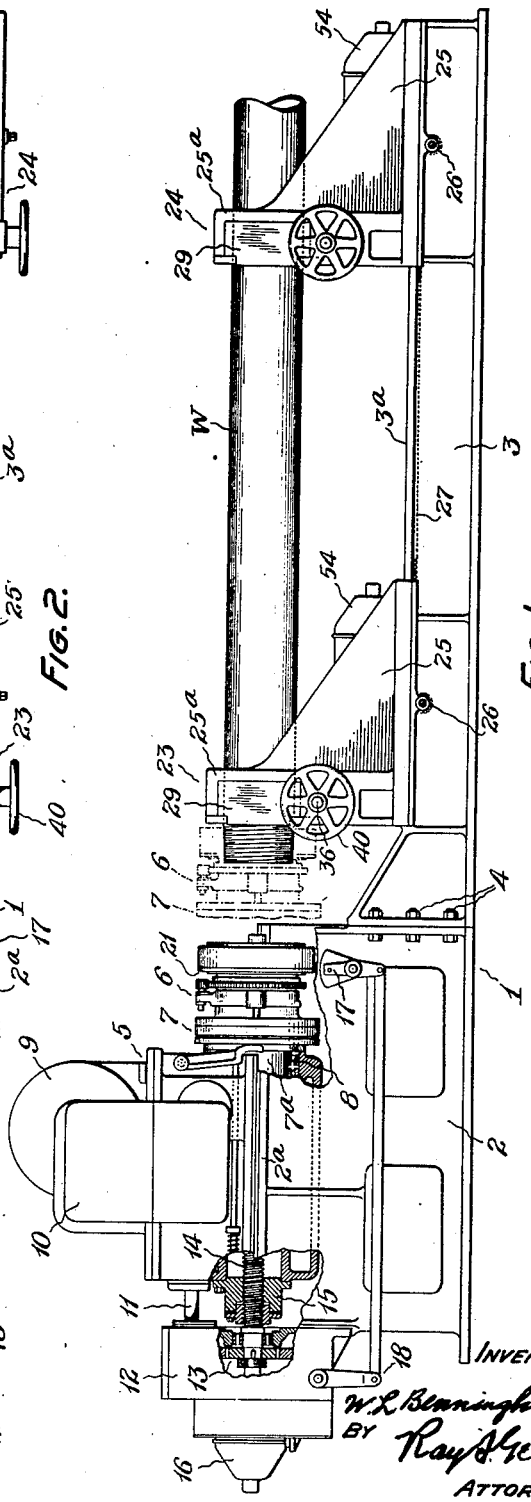
INVENTOR:
W. L. Benninghoff
BY Ray H. Geles
ATTORNEY

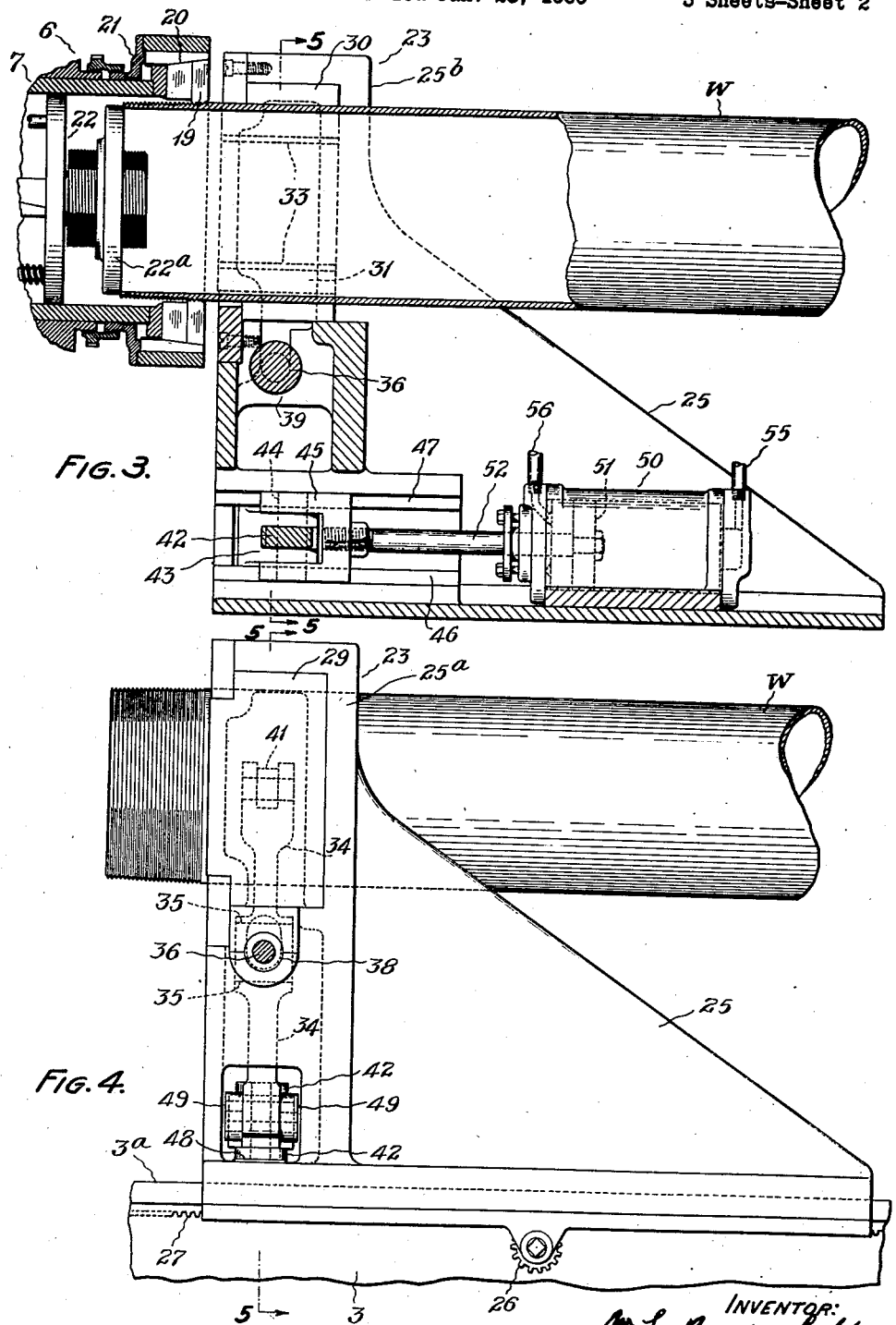

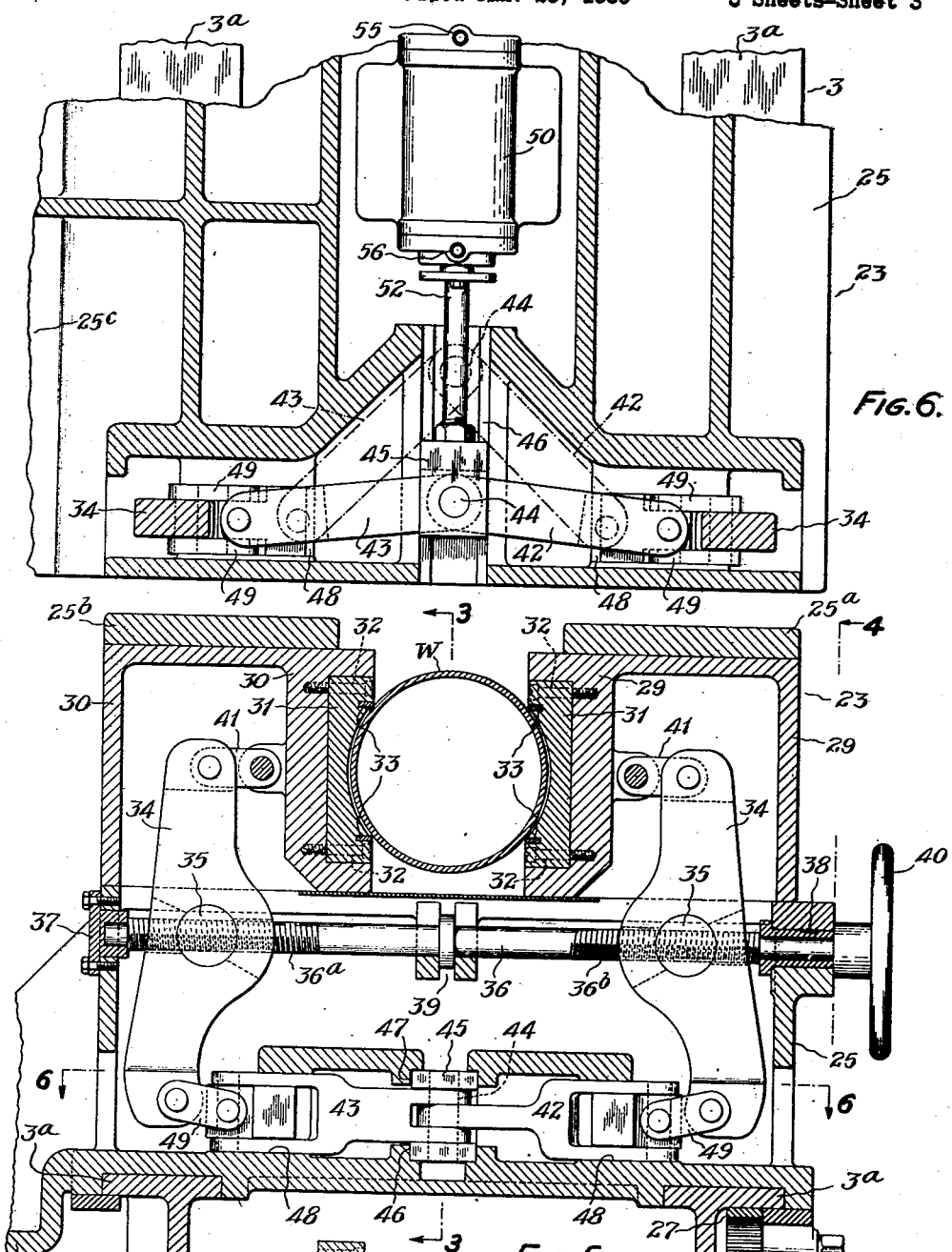

Patented Jan. 12, 1937

2,067,626

UNITED STATES PATENT OFFICE 2,067,626

PIPE THREADING MACHINE

William L. Benninghoff, Shaker Heights, Ohio

Application January 28, 1935, Serial No. 3,721

3 Claims. (Cl. 10—107)

The invention relates to mechanism for forming threads on pipes or other similar bodies.

An important object of the invention is the provision of a machine well adapted to cut accurately-formed screw threads on pipes and particularly on pipe sections of relatively large diameter and considerable length.

A further object of the invention, also ancillary to the object first stated, is the provision in a machine of the character stated of means for supporting the pipe while being threaded which is adapted to hold the pipe fixedly and accurately in position without distortion of the portion of the pipe being threaded.

Another object of the invention is the provision of a pipe-threading machine such as last referred to adapted to handle relatively large and long pipe sections and to be loaded with the work and unloaded rapidly and easily.

Further objects of the invention, more or less ancillary or incidental to those already stated, will be apparent from the following description of the preferred form of embodiment shown in the accompanying drawings.

In the drawings,

Fig. 1 is a side elevation of a machine embodying the invention with some of the parts broken away to better disclose details of construction and with the thread-cutting tool proper in retracted position as shown by full lines and in advanced position as shown by dot-and-dash lines.

Fig. 2 is a plan view of the machine.

Fig. 3 is an enlarged fragmentary section showing a portion of the thread-cutting tool and one of the pipe clamping mechanisms of the machine.

Fig. 4 is an enlarged side elevation of the pipe clamping mechanism shown in Fig. 3.

Fig. 5 is a vertical section on the line 5—5 of Fig. 3 and Fig. 4.

Fig. 6 is a horizontal section on the line 6—6 of Fig. 5.

Fig. 7 is a vertical sectional view showing a second form of the interchangeable face blocks for the clamping jaws.

In prior pipe-threading machines it has been the usual practice in the threading operation either to rotate the pipe while the thread-forming tool is fed axially in relation to the pipe or to hold the pipe against rotation but feed it axially toward a rotating thread-forming tool. With such prior machines it has been found to be practically impossible to form uniformly accurate screw threads on pipes, particularly where pipe sections of relatively large diameter and of considerable length are to be threaded. This unsatisfactory result in the case of prior machines is due, I believe, either to the fact that the pipe while being threaded is not maintained in a true axial relation to the thread-cutting tool or to the fact that that part of the pipe being threaded is distorted, or is due to both of these facts. In carrying out my present invention I have sought to overcome these difficulties by providing means adapted to hold the pipe accurately in fixed position and without distortion of the threaded parts while the screw thread is being formed.

Referring in detail to the construction illustrated, the machine is provided with a bed frame designated in its entirety by the numeral 1 and comprising a section 2 upon which the thread-cutting tool and the driving mechanism therefor are mounted and a section 3 upon which the pipe-supporting means are mounted, the two sections 2 and 3 being preferably rigidly secured together as by bolts 4, 4. The frame section 2 is provided with ways 2a, 2a upon which is slidably mounted a carriage 5. In one end of this carriage is rotatably mounted a threading die designated as an entirety by 6, said threading die having a body 7 formed with a trunnion part 7a which is rotatably mounted in bearings in the carriage 5, one of said bearings being shown at 8. A motor 9 mounted on the top of the carriage 5 serves to rotate the die 6 through the medium of a suitable train of gears, not shown, within the gear box 10 and the frame or casing of the carriage. The train of gears referred to has a suitable spline connection with a shaft 11 which is mounted in a gear box 12 bolted to the end of the frame section 2. The shaft 11 through a train of gears 13 enclosed in the gear box 12 rotates a feed screw 14 which operatively engages a nut 15 fixedly secured to the carriage 5 so that the rotation of the feed screw 14 is adapted to feed the carriage 5 forward (to the right in Fig. 1) or to retract it, according to the direction of rotation of the screw. Consequently the motor 9 is adapted to rotate the threading tool 6 and simultaneously feed said tool axially forward to the work.

To effect a rapid retraction of the carriage 5 I provide a separate motor 16 which is connected by suitable gears with the train of gears 13 in a manner to rotate the feed screw 14 at a higher speed than is feasible with the gear connection between the motor 9 and said feed screw. The hand lever 17 (a part of which is broken away in Fig. 1) is connected by suitable link and lever devices designated as an entirety by 18 with a clutch mechanism (not shown) adapted to operatively connect the train of gears between the motor 16 and the feed screw 14 and to disconnect the train of gears between the motor 9 and said feed screw or vice versa.

The detailed forms of construction of the mechanism for rotating and axially feeding the thread-forming tool 6 can be varied widely in carrying out my invention and I have, therefore, deemed it unnecessary to illustrate and describe such parts of the mechanism in full detail.

Similarly, in carrying out my invention the thread-forming tool itself may take a wide variety of known forms of such tools and it is unnecessary, therefore, to describe it in detail. As illustrated the tool 6 is of the same character as the threading die disclosed in my copending application Serial No. 743,801 filed September 13, 1934, to which reference may be had for a complete detail disclosure. For the purpose of disclosing the present invention it will suffice to state that the tool comprises a series of cutters or chasers 19 (Fig. 3) slidably mounted on the front end of the tool body 7 so as to be gradually retracted outward in relation to the pipe during the cutting operation in order to form the usual taper thread. To effect such retraction of the chasers they are operatively connected by cam devices 20 with a structure 21 slidably mounted on the outside of the tubular tool body 7 and this slide 21 is in turn connected by suitable cam devices (not shown) with a structure 22 slidably mounted inside the tool body 7. The inner slide 22 carries an adjustable plate 22a adapted to engage the end of the pipe to be threaded so that when the tool body 7 is fed axially forward in relation to the pipe the inner slide 22 is moved longitudinally of the tool body and, by its cam connection with the outer slide 21, effects a similar longitudinal movement of the latter on the tool body and in relation to the chasers 19 so that the latter, by reason of their cam connection 20 with the slide 21 are gradually retracted in the manner referred to. The tool 6 may be provided with mechanism, such as is disclosed in full detail in my copending application above referred to, for effecting a rapid retraction of the chasers out of engagement with the pipe, at the end of the thread-forming operation and the tool may be provided with suitable means for resetting the chasers when the carriage and the tool 6 have been returned to their starting position preparatory to starting another thread-cutting operation. The chasers 19 are mounted at the extreme end of the cutting tool in such a manner that they can approach close to a work support.

Slidably mounted on the elongated main frame section 3 are two pipe clamp mechanisms designated in their entireties by 23 and 24, respectively. These two clamping mechanisms are substantially the same in construction so that a description of the mechanism 23, as illustrated in the several figures of the drawings, will be understood as applying also to the mechanism 24. In Figs. 1 and 2 the reference numerals applied to the mechanism 23 are also applied to the corresponding parts of the mechanism 24 insofar as those parts are shown.

The clamp mechanism has a rigid frame structure 25 formed to engage and slide upon the ways 3a, 3a of the main frame. The frame 25 carries a rotatably mounted pinion 26 which meshes with a rack 27 attached to the under side of one of the ways 3a (Figs. 4 and 5). By turning the pinion 26 by hand the clamp mechanism 23 can be adjusted longitudinally of the frame 3.

The frame 25 is formed with two upward extending arms 25a, 25b which are spaced apart to form a relatively wide intervening space 28 (Fig. 5). Slidably mounted for horizontal movement in the arms 25a, 25b are two pipe-gripping jaws 29, 30, each of which is provided with a removable face or gripping block 31 secured to the jaw by bolts 32, 32. The block 31 is preferably provided with hardened steel inserts 33 adapted to bite into the pipe held by the jaws. To adapt the machine to handle pipes of different sizes the face blocks 31 are made removable and interchangeable so that by the use of blocks 31, such as are shown in Fig. 5, a relatively large pipe can be handled while, by substituting for the blocks 31 a modified form, such as is shown at 31a in Fig. 7, considerably smaller pipe sections can be handled. As will be noted in the drawings, the front sides of the jaws 29 and 30 extend to or beyond the front sides of the supporting arms 25a, 25b.

I provide mechanism for actuating the jaws 29, 30 which is adapted simultaneously to move the jaws alternatively toward or away from each other in a manner to maintain them in symmetrical relation to the axis of the thread-forming tool 6. This mechanism comprises two upright levers 34, 34 which are pivotally mounted on short shaft sections 35, 35. These shaft sections are adjustably mounted on a supporting shaft 36 which is rotatably mounted in bearings 37 and 38 in the frame 25, being held against endwise movement by a thrust bearing at 39. The shaft sections 35 are formed with threaded transverse apertures to engage the sections 36a, 36b of the shaft 36, said sections being threaded oppositely to each other. The front end of the shaft 36 is fitted with a hand wheel 40 by which the shaft can be turned to adjust the pivots 35, 35 toward or away from each other. The upper ends of the levers 34 are connected by links 41, 41 with their respective jaws 29 and 30.

To actuate the levers 34, 34 I provide a pair of toggle links 42, 43 which are pivotally connected together by a pin 44 carried by a cross head 45 slidably mounted in ways 46 and 47 in the frame 25 (Figs. 5 and 6). The other ends of the toggle links 42, 43 slidably engage raised pads 48, 48 formed on the frame 25 and are pivotally connected by links 49, 49 to the lower ends of the levers 34.

Power means for actuating the toggle links comprises a reciprocating hydraulic motor 50 having a piston 51 and a piston rod 52 which is connected to the cross head 45 (Fig. 3). The piston of motor 50 is actuated by a pump 53 which may conveniently be of the gear type and which can be driven in either direction by an electric motor 54. The pump and its motor are supported upon an extension 25c of the frame 25. The pump 53 and the motor 50 are connected by conduits 55 and 56 and by driving the pump in one direction the motor piston 51 is moved in a direction to straighten the toggle linkage and move the clamping jaws 29, 30 toward each other, while by driving the pump 53 in the opposite direction the jaws 29 and 30 are moved away from each other.

The conduit 55 leading from one pressure chamber of the pump 53 and to the rear side of the motor piston 51 is provided with a branch conduit 57 leading to the supply reservoir of the pump. The conduit 57 is controlled by a spring-pressed check valve 58 which opens when the pressure in conduit 55 rises to a predetermined value to permit escape of liquid through the branch conduit 57. The relief valve 58 is provided with manual means 58a by which the tension of the valve spring can be adjusted to vary the pressure at which the valve opens. The detail construction of the valve is not shown as such valves are well known. With this arrangement the maximum force with which the clamping jaws 29 and 30 are pressed against a pipe, as shown in Fig. 5, can be limited to any desired value by suitable adjustment of means 58a.

It is apparent that the jaw-actuating devices of the clamp mechanism are adapted to move the jaws 29 and 30 simultaneously and equally toward or from each other according to the direction of movement of the hydraulic motor 50, thus serving automatically to center the pipe in relation to the tool 6. By turning the hand wheel 40 to change the positions of the supporting shafts 35 of the levers 34 the jaws can be adjusted toward and away from each other and thus adapt the clamp to hold pipes of a wide range of sizes.

As has been said, the clamp mechanism 24 is similar to the mechanism 23, but it will be apparent that the relief valve 58 of the mechanism 24 can be set differently than the corresponding relief valve of the mechanism 23 so that the gripping pressures of the two clamps can at will be made different.

The operation of the machine in the threading of pipes will readily be apparent from the foregoing description. The clamps 23 and 24 are first adjusted to suitable positions upon the bed frame 3 according to the size of the pipe sections to be threaded. In the drawings, for purposes of illustration, I have shown at W a pipe section of relatively large size and considerable length. With the clamps 23, 24 suitably positioned and with their clamping jaws retracted the pipe section W to be threaded is readily placed in position by lowering it between the arms 25a, 25b and the clamping jaws, no endwise movement of the heavy pipe section being necessary. With the pipe section lowered into position between the clamping jaws the latter are moved into operative engagement with the pipe by starting the pumps 53 of the two clamps in a direction to bring the clamping jaws together, and the continued operation of the pumps cause the clamps firmly to hold the pipe section in alignment with the tool 6. By suitably adjusting the relief valves 58 of the two clamping mechanisms the maximum clamping pressure for the clamp 23 can be made sufficiently great to hold the front end of the pipe firmly in fixed position yet not great enough to cause any deformation of the cross sectional form of the pipe. On the other hand, the relief valve 58 of the clamp 24 can be set so that the latter clamp will exert a higher pressure not only to hold the rear end of the pipe section firmly in fixed alignment with the axis of the threading tool but also to grip the pipe section strongly enough to obviate any turning of the pipe in the clamps. A clamping pressure strong enough for this purpose may cause temporary deformation of the cross sectional form of the rear section of the pipe but as this deformation is at a point remote from the section of the pipe to be threaded, it does not affect the form of the threads cut.

With the pipe section clamped in position as shown in Figs. 1 and 2 and with the threading tool 6 in retracted position as shown in full lines in said figures the motor 9 is started to rotate the threading tool 6 and simultaneously feed it forward to the work. Alternatively the higher speed feed driven by the motor 16 can be employed initially to feed the tool 6 forward until it is close to the work and then the motor 16 can be thrown out and the motor 9 started. The operation of the tool 6 in cutting the thread need not be described in detail as it constitutes no part of the present invention. Suffice it to say that when the tool has reached the end of the thread-cutting operation the tool, as indicated by dot-and-dash lines in Fig. 1, if it be of the type illustrated, will automatically retract the chasers, whereupon the motor 9 is thrown out of operation and the motor 16 started to retract the tool and permit the pipe to be released from the clamps and removed preparatory to the insertion of another pipe section or to the reversal of the pipe section for the threading of its other end. To release the pipe from the clamps, the pipe is supported while the pumps 53 are reversed and the clamping jaws separated until the pipe can be lifted from between the jaws.

It will be seen that by mounting the threading tool for both rotation and axial feed to the work I am enabled to support the work firmly in fixed position and thus maintain a highly accurate alignment of the work and the die, which is a condition essential to the formation of accurate threads. This improved result is especially significant in the case of pipe sections of considerable length which cannot well be held in alignment if they are in motion during the threading operation.

However, as has been indicated, the object of forming a thread true to form may be defeated, notwithstanding good alignment of the pipe, if the pipe-holding means distorts that part of the pipe being threaded. Such distortion is avoided in my improved machine by employing a pipe clamp close to the portion of the pipe being threaded and limiting its clamping pressure so as not to press the pipe out of round yet holding it firmly against later movement, the heavier pressure necessary to prevent rotation or endwise movement of the pipe being provided by a second clamp disposed sufficiently remote from that part of the pipe being threaded so that temporary distortion of the cross sectional form of the pipe by the last named clamp does not affect the form of the threaded part of the pipe.

The construction of the tool 6 and clamp 23 so that the jaws of the clamp can be positioned close to the part of the pipe to be threaded insures a firm holding of the pipe without lateral distortion.

Obviously the positioning of the pipe in alignment with the tool proper is facilitated by the self-centering action of the pipe clamps. Also, the construction of the clamps permitting pipes to be threaded to be directly lowered between the clamping jaws contributes notably to the ease with which the machine can be loaded with the work and again unloaded.

From what has been said it will be apparent that the construction of the machine shown and described can be varied widely in various respects without departing from the invention as defined in the appended claims.

What I claim is:

1. In a pipe-threading machine in which a thread-cutting tool movably mounted on the machine frame is simultaneously rotated and advanced toward the work, the combination with the machine frame of means thereon for fixedly supporting a section of pipe in axial alignment with the tool while the latter operatively engages it, said means comprising a clamp adapted, without substantial distortion of the cross-sectional form of the pipe, to grip the said pipe sufficiently close to the part thereof to be threaded to hold said part of the pipe against movement transversely of its axis, and a second clamp adapted during the threading operation more strongly to grip the pipe at points sufficiently remote from the part to be threaded so that local distortion of the cross sectional form of the pipe by said clamp will not affect the form of the thread cut on the pipe.

2. A machine as claimed in claim 1, in which the clamp arranged closer to the part of the pipe to be threaded comprises movable clamping jaws, mechanism for forcing the jaws against the sides of the pipe, and means operating automatically to limit the pressure which the jaws exert on the pipe to prevent distortion of the cross sectional form of that part of the pipe upon which the threads are cut.

3. A machine as claimed in claim 1, in which the clamp closer to the part of the pipe to be threaded is adapted to grip the pipe immediately adjacent the part thereof to be threaded without interference with the thread-cutting tool.

WILLIAM L. BENNINGHOFF.